(12) United States Patent
Anderson et al.

(10) Patent No.: US 7,537,393 B2
(45) Date of Patent: May 26, 2009

(54) CONNECTORIZED FIBER OPTIC CABLING AND METHODS FOR FORMING THE SAME

(75) Inventors: Timothy W. Anderson, Omaha, NE (US); Richard L. Case, Omaha, NE (US)

(73) Assignee: Commscope, Inc. of North Carolina, Hickory, NC (US)

( * ) Notice: Subject to any disclaimer, the term of this patent is extended or adjusted under 35 U.S.C. 154(b) by 445 days.

(21) Appl. No.: 11/438,647

(22) Filed: May 22, 2006

(65) Prior Publication Data

US 2006/0280408 A1      Dec. 14, 2006

Related U.S. Application Data

(60) Provisional application No. 60/688,492, filed on Jun. 8, 2005, provisional application No. 60/688,493, filed on Jun. 8, 2005.

(51) Int. Cl.
*G02B 6/40*     (2006.01)
(52) U.S. Cl. .............................. 385/54; 385/55; 385/56; 385/58; 385/59; 385/60; 385/100; 385/109; 385/110; 385/113
(58) Field of Classification Search .................. 385/54, 385/55, 56, 58, 59, 60, 100, 109, 110, 112
See application file for complete search history.

(56) References Cited

U.S. PATENT DOCUMENTS

| | | | |
|---|---|---|---|
| 4,337,923 A | 7/1982 | Smith | |
| 4,595,839 A | 6/1986 | Braun et al. | |
| 4,626,067 A | 12/1986 | Watson | |

(Continued)

FOREIGN PATENT DOCUMENTS

EP      1039323 A1      9/2000

(Continued)

OTHER PUBLICATIONS

US Conec® Ltd., "MTP® Housing Assembly Procedure for Cabled Multifiber Optical Ribbon," EG-0024, Sep. 2001, 4 pages.

(Continued)

*Primary Examiner*—Frank G Font
*Assistant Examiner*—James P Hughes
(74) *Attorney, Agent, or Firm*—Myers Bigel Sibley & Sajovec, PA

(57) ABSTRACT

A connectorized fiber optic cabling assembly includes a loose tube fiber optic cable and a connector assembly. The cable has a termination end and includes: an optical fiber bundle including a plurality of optical fibers; at least one strength member; and a jacket surrounding the optical fiber bundle and the at least one strength member. The connector assembly includes a rigid portion and defines a fiber passage. The connector assembly is mounted on the termination end of the cable such that the optical fiber bundle extends through at least a portion of the fiber passage. The plurality of optical fibers of the optical fiber bundle have a ribbonized configuration in the rigid portion of the connector assembly and a loose, non-ribbonized configuration outside the rigid portion. The plurality of optical fibers undergo a transition from the ribbonized configuration to the loose, non-ribbonized configuration in the rigid portion of the connector assembly. According to some embodiments, the rigid portion of the connector assembly includes a rigid connector housing.

33 Claims, 13 Drawing Sheets

U.S. PATENT DOCUMENTS

| | | | |
|---|---|---|---|
| 4,690,498 A | 9/1987 | Priaroggia | |
| 4,949,894 A | 8/1990 | Winter et al. | |
| 5,600,097 A | 2/1997 | Bleich et al. | |
| 5,611,016 A | 3/1997 | Fangmann et al. | |
| 5,630,003 A | 5/1997 | Arroyo | |
| 5,684,910 A | 11/1997 | Chapin et al. | |
| 5,689,090 A | 11/1997 | Bleich et al. | |
| 5,739,473 A | 4/1998 | Zerbs | |
| 5,740,295 A | 4/1998 | Kinard et al. | |
| 5,745,627 A | 4/1998 | Arroyo et al. | |
| 5,751,879 A | 5/1998 | Graham et al. | |
| 5,838,864 A | 11/1998 | Patel et al. | |
| 5,857,051 A | 1/1999 | Travieso et al. | |
| 5,878,182 A | 3/1999 | Peckham | |
| 5,913,003 A | 6/1999 | Arroyo et al. | |
| RE36,592 E | 2/2000 | Giebel et al. | |
| 6,108,475 A | 8/2000 | Chapin et al. | |
| 6,160,939 A | 12/2000 | Sheu | |
| 6,178,278 B1 | 1/2001 | Keller et al. | |
| 6,185,351 B1 | 2/2001 | Daneshvar et al. | |
| 6,205,277 B1 | 3/2001 | Mathis et al. | |
| 6,256,438 B1 | 7/2001 | Gimblet | |
| 6,317,542 B1 * | 11/2001 | Hardwick et al. | 385/114 |
| 6,317,543 B1 | 11/2001 | Sheu | |
| 6,324,324 B1 | 11/2001 | Dixon et al. | |
| 6,775,444 B1 | 8/2004 | Hurley | |
| 6,807,347 B2 * | 10/2004 | McAlpine et al. | 385/103 |
| 6,922,511 B2 * | 7/2005 | Rhoney et al. | 385/106 |
| 6,987,916 B2 | 1/2006 | Storaasli | |
| 7,010,206 B1 | 3/2006 | Baker et al. | |
| 2003/0068147 A1 * | 4/2003 | Nechitailo | 385/114 |
| 2003/0091307 A1 | 5/2003 | Hurley et al. | |
| 2003/0113079 A1 | 6/2003 | Storaasli | |
| 2005/0196113 A1 | 9/2005 | Hurley et al. | |
| 2005/0244115 A1 * | 11/2005 | Bocanegra et al. | 385/110 |
| 2006/0045452 A1 | 3/2006 | Williams | |
| 2006/0159407 A1 | 7/2006 | Kachmar | |
| 2006/0159408 A1 | 7/2006 | Kim et al. | |
| 2006/0280413 A1 * | 12/2006 | Paschal et al. | 385/112 |
| 2007/0081774 A1 * | 4/2007 | Suzuki et al. | 385/109 |
| 2007/0183727 A1 * | 8/2007 | Strack et al. | 385/115 |
| 2008/0267569 A1 * | 10/2008 | Ginocchio et al. | 385/109 |

FOREIGN PATENT DOCUMENTS

| | | |
|---|---|---|
| EP | 1310814 A1 | 5/2003 |
| JP | 63167324 | 7/1988 |
| JP | 6118282 | 4/1994 |
| JP | 6347670 | 12/1994 |
| JP | 8005868 | 1/1996 |
| JP | 2001525557 T | 12/2001 |
| JP | 2002148480 | 5/2002 |
| JP | 2002148481 | 5/2002 |
| WO | WO 99/28773 A2 | 6/1999 |

OTHER PUBLICATIONS

US Conec® Ltd., "MTP® Termination Procedure for Cabled Multifiber Optical Ribbon," EG-0023, Jul. 2001, 7 pages.

* cited by examiner

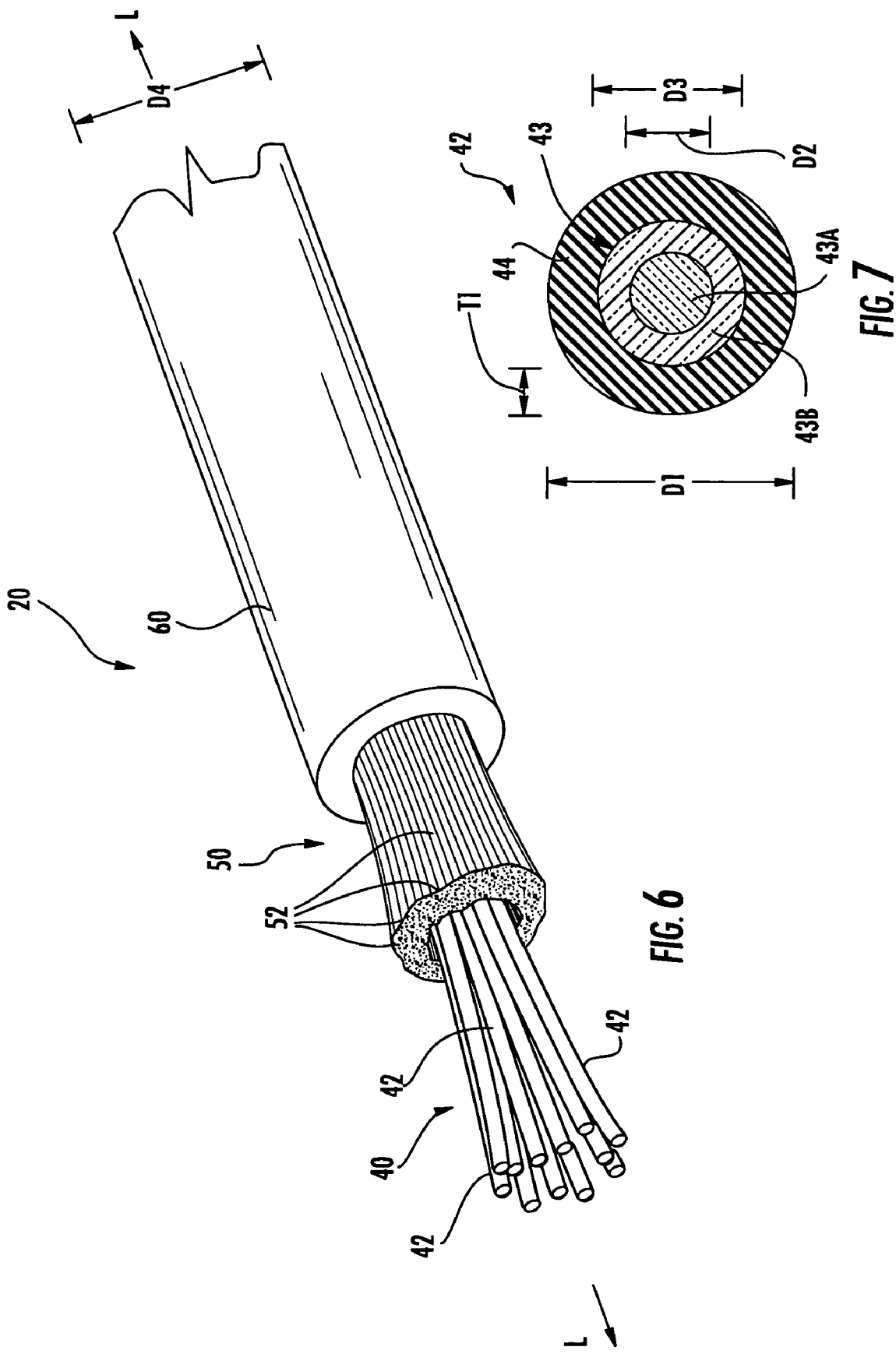

CONNECTORIZED FIBER OPTIC CABLING AND METHODS FOR FORMING THE SAME

RELATED APPLICATIONS

This application claims the benefit of priority from U.S. Provisional Patent Application No. 60/688,492, filed Jun. 8, 2005, and U.S. Provisional Patent Application No. 60/688,493, filed Jun. 8, 2005, the disclosures of which are incorporated herein by reference in their entireties.

FIELD OF THE INVENTION

The present invention relates to communications cabling and, more particularly, to connectorized fiber optic cabling and methods for forming the same.

BACKGROUND OF THE INVENTION

Fiber array connectors are commonly employed to terminate multi-fiber fiber optic cables. Such connectors require that the fibers of the cable be arranged in a row or side-by-side, aligned configuration. In some cases, multiple, stacked layers or rows of fibers may be used. One method for providing fibers so arranged is to use ribbonized cabling. However, ribbonized cabling may suffer from drawbacks in bendability and cost. Another method is to use loose tube fiber cabling, ribbonize a relatively long section (e.g., from about 2 to 8 inches) of the fibers and install furcation tubing and other components on the cabling. This method using furcation tubing may suffer from various drawbacks in cost, bendability, installation requirements, etc. For example, epoxy typically must be used to secure a transition between the cable and the furcation tubing.

SUMMARY OF THE INVENTION

According to embodiments of the present invention, a connectorized fiber optic cabling assembly includes a loose tube fiber optic cable and a connector assembly. The cable has a termination end and includes: an optical fiber bundle including a plurality of optical fibers; at least one strength member; and a jacket surrounding the optical fiber bundle and the at least one strength member. The connector assembly includes a rigid portion and defines at least one fiber passage. The connector assembly is mounted on the termination end of the cable such that the optical fiber bundle extends through at least a portion of the at least one fiber passage. The plurality of optical fibers of the optical fiber bundle have a ribbonized configuration in the rigid portion of the connector assembly and a loose, non-ribbonized configuration outside the rigid portion. The plurality of optical fibers undergo a transition from the ribbonized configuration to the loose, non-ribbonized configuration in the rigid portion of the connector assembly. According to some embodiments, the rigid portion of the connector assembly includes a rigid connector housing.

According to method embodiments of the present invention, a method for forming a connectorized fiber optic cabling assembly includes providing a loose tube fiber optic cable having a termination end and including: an optical fiber bundle including a plurality of optical fibers having a loose, non-ribbonized configuration; at least one strength member; and a jacket surrounding the optical fiber bundle and the at least one strength member. The method further includes mounting a connector assembly including a rigid portion and defining at least one fiber passage on the termination end of the cable such that the optical fiber bundle extends through at least a portion of the at least one fiber passage, and such that the plurality of optical fibers of the optical fiber bundle have a ribbonized configuration in the rigid portion of the connector assembly and a loose, non-ribbonized configuration outside the rigid portion, and the plurality of optical fibers undergo a transition from the ribbonized configuration to the loose, non-ribbonized configuration in the rigid portion of the connector assembly. According to some embodiments, the rigid portion of the connector assembly includes a rigid connector housing.

According to some embodiments, a connectorized fiber optic cabling assembly includes a loose tube fiber optic cable and a connector assembly. The loose tube fiber optic cable has a termination end and includes: an optical fiber bundle including a plurality of optical fibers; at least one strength member; and a jacket surrounding the optical fiber bundle and the at least one strength member. The connector assembly is mounted directly on the termination end of the cable. The plurality of optical fibers of the optical fiber bundle have a ribbonized configuration in the connector assembly and a loose, non-ribbonized configuration outside the connector assembly and in the cable. According to some embodiments, the cable is a round, loose tube cable.

According to some embodiments, a method for forming a connectorized fiber optic cabling assembly includes providing a loose tube fiber optic cable having a termination end and including: an optical fiber bundle including a plurality of optical fibers; at least one strength member; and a jacket surrounding the optical fiber bundle and the at least one strength member. The method further includes mounting a connector assembly directly on the termination end of the cable such that the plurality of optical fibers of the optical fiber bundle have a ribbonized configuration in the connector assembly and a loose, non-ribbonized configuration outside the connector assembly and in the cable. According to some embodiments, the cable is a round, loose tube cable.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 6 is an enlarged, fragmentary view of a cable forming a part of the connectorized cabling of FIG. 1.

FIG. 7 is a cross-sectional view of an optical fiber forming a part of the cable of FIG. 6.

DETAILED DESCRIPTION OF EMBODIMENTS OF THE INVENTION

Figure 1:
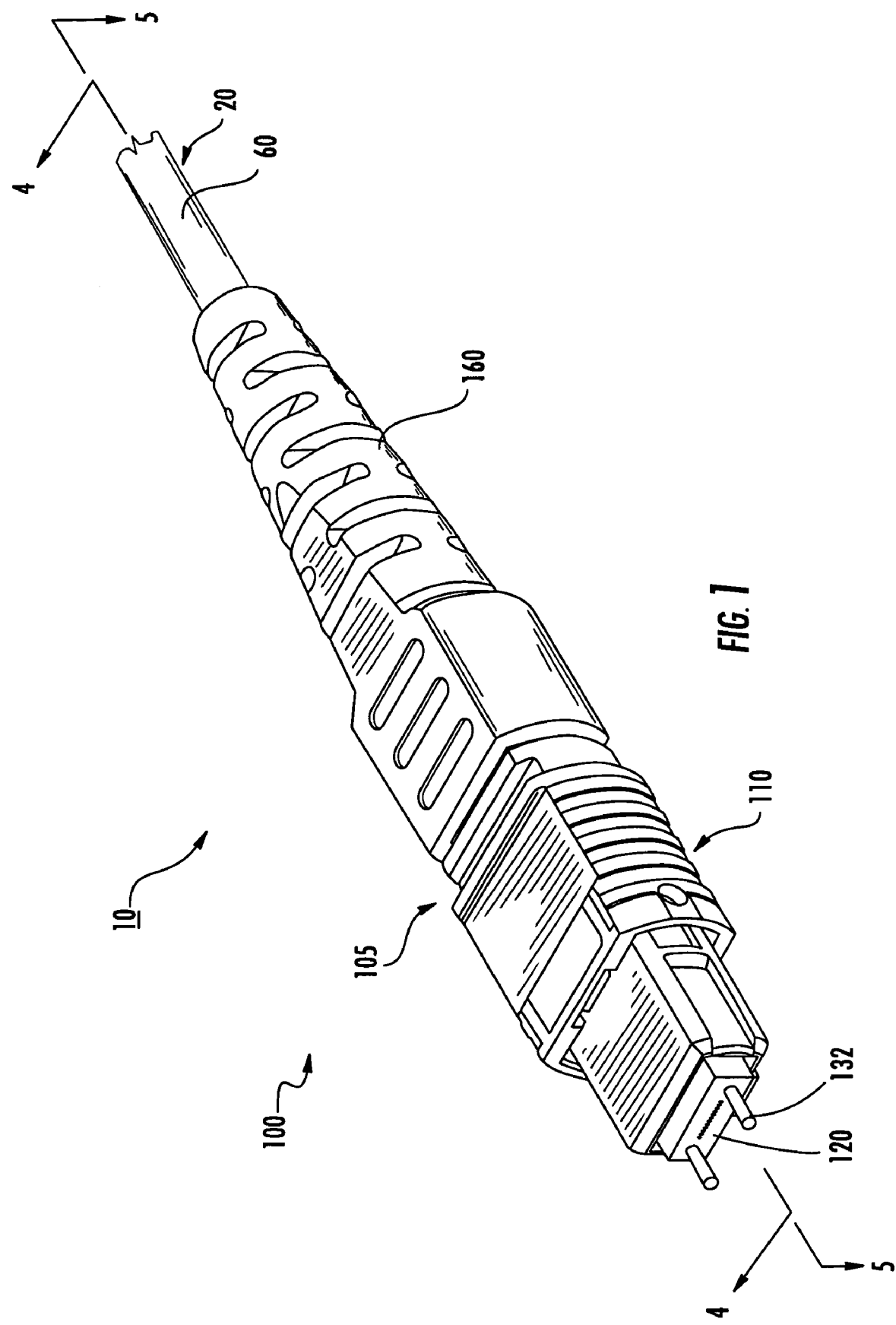
FIG. 1 is a front perspective view of a connectorized cabling in accordance with embodiments of the present invention.
Figure 2:
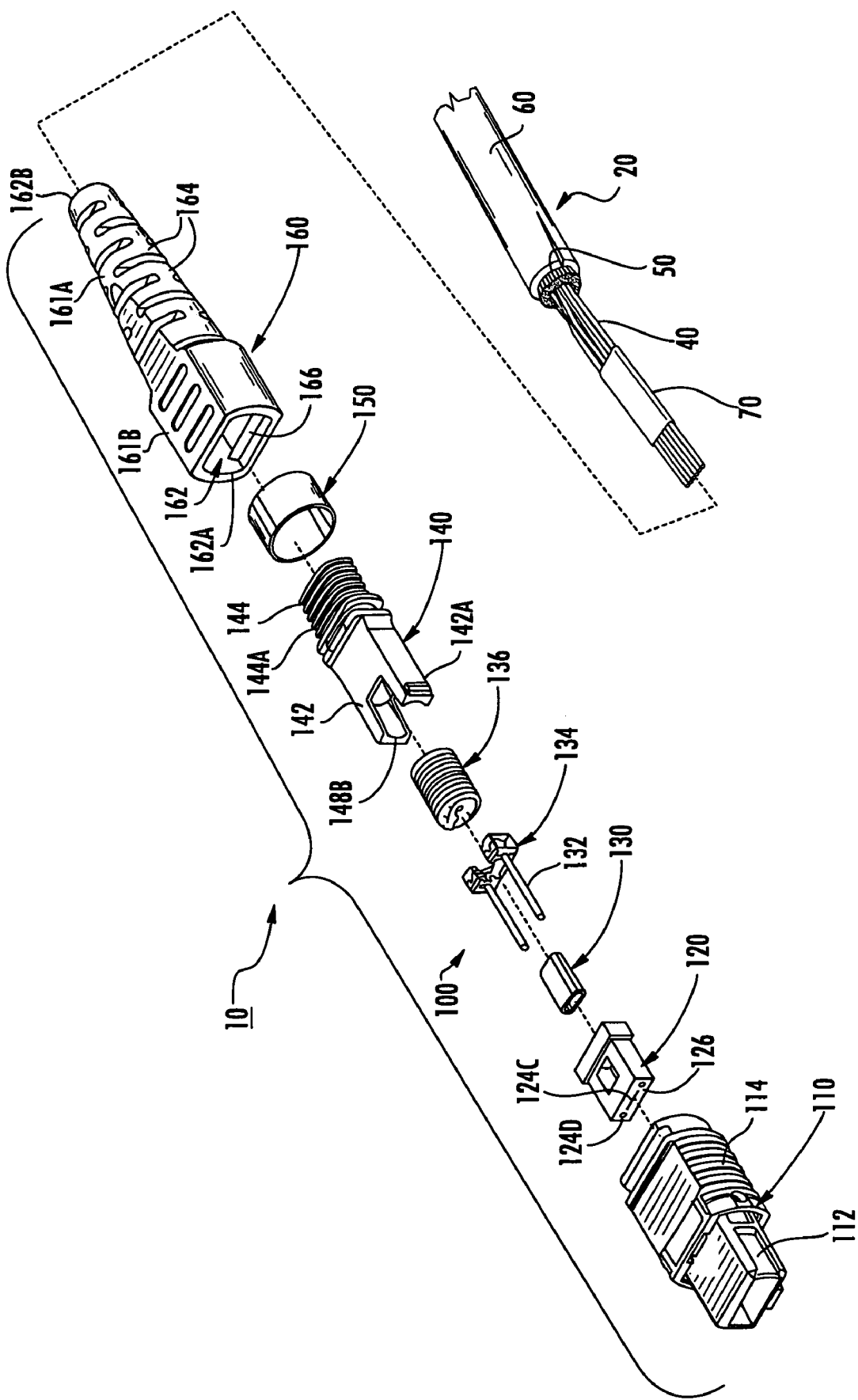
FIG. 2 is a front exploded, perspective view of the connectorized cabling of FIG. 1.
Figure 3:
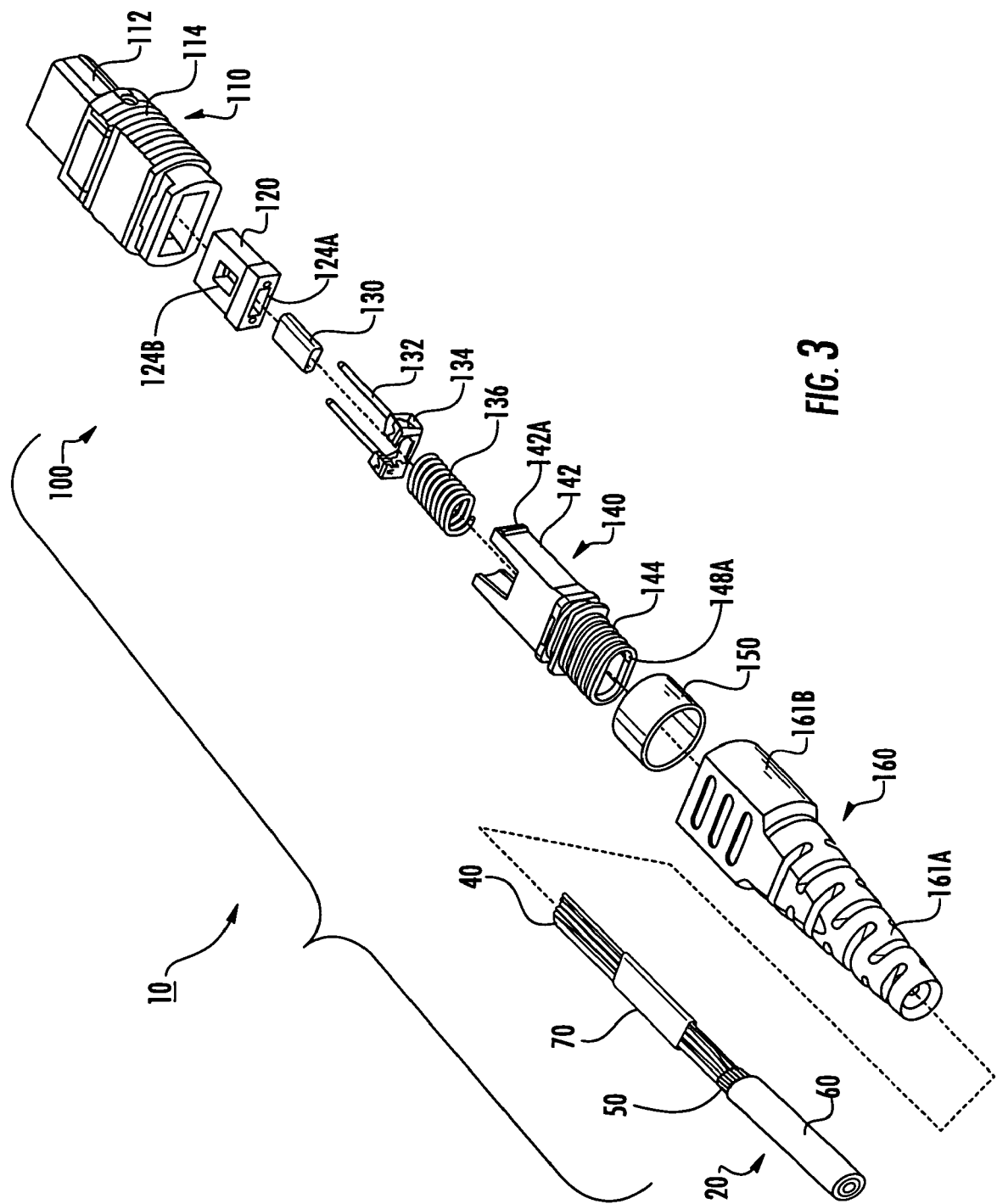
FIG. 3 is a rear exploded, perspective view of the connectorized cabling of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIGS. 1-5, a connectorized cabling or cordage assembly 10 according to embodiments of the present invention is shown therein. The connectorized cabling 10 includes a cable 20 and a connector assembly 100. The connector assembly 100 may be an optical fiber array or multi-fiber push-on (MPO) type connector (which may also be referred to as an oval connector). The connector assembly 100 may be a plug connector as shown or, alternatively, a female jack connector with suitable modifications.

The cable 20 may be a breakout or subunit cable from a larger cable including multiple cable subunits and one or more additional jackets. According to some embodiments, the cable 20 is constructed as disclosed in co-assigned U.S. patent application Ser. No. 11/412,616, filed Apr. 27, 2006, entitled Fiber Optic Cables and Methods for Forming the Same, the disclosure of which is incorporated herein by reference.

As shown in FIG. 6, the cable 20 includes generally a plurality of non-buffered optical fibers 42 (collectively forming a fiber bundle 40), a plurality of strength members or yarns 52 (collectively forming a yarn bundle 50), and a protective jacket 60. According to some embodiments and as illustrated, the cable 20 is round in cross-section and the foregoing groups of components are substantially concentrically positioned about and extend together along a length axis L-L. According to some embodiments, the fiber bundle 40 includes at least eight (8) non-buffered optical fibers 42. As shown, the fiber bundle 40 includes twelve (12) non-buffered optical fibers 42. According to some embodiments, the optical fibers 110 are loose with respect to one another so that they have no particular, fixed relative orientation.

An exemplary one of the optical fibers 42 is shown in cross-section in FIG. 7. The optical fiber 42 includes a glass fiber 43, which includes a glass core 43A and a surrounding glass cladding 43B. The glass fiber 43 may be constructed in any suitable manner. For example, each of the core 43A and the cladding 43B may include one or more concentric segments or layers, may be doped, etc. The glass fiber 43 may be formed of any suitable materials and using any suitable methods. A coating layer 44 surrounds the cladding 43B. The coating layer 44 provides environmental protection for the glass fiber 43. As illustrated, the coating layer 44 consists of a single coating layer; however, multiple concentric layers may be applied to form the overall layer 44. According to some embodiments, the coating layer 44 is formed of a UV light-cured acrylate. The coating layers 44 of the respective optical fibers 42 may have different colors for color-coding purposes.

According to some embodiments and as illustrated, the optical fiber 42 is an optical fiber constructed as commonly referred to as a "bare optical fiber" or a "non-buffered optical fiber". According to some embodiments, the overall diameter D1 of the optical fiber 42 is in the range of from about 235 to 265 μm. According to some embodiments, the thickness T1 of the coating layer 44 is no greater than about 70.5 μm. According to some embodiments, the overall diameter D1 is between about 235 to 265 μm and the thickness T1 of the coating layer 44 is no greater than about 70.5 μm. According to some embodiments, the diameter D2 of the core 43A is between about 6 and 64 μm and the diameter D3 of the cladding 43B is between about 115 and 135 μm.

As shown, the bundle 50 of the strength yarns 52 at least partially surrounds the optical fiber bundle 40. The strength yarns 52 may be formed of any suitable material. According to some embodiments, the strength yarns 52 are aramid fibers. Other suitable materials may include fiberglass or polyester. According to some embodiments, the strength yarns 52 each have a denier in the range of from about 250 to 3000. According to some embodiments, the strength yarn bundle 50 includes between about 2 and 10 ends or strands of the strength yarns 52 (which may each include hundreds of filaments).

The jacket 60 surrounds the yarn bundle 50 and the optical fiber bundle 40, which reside in a longitudinal passage defined in the jacket 60. The jacket 60 may be formed of any suitable material such as a polymeric material. According to some embodiments, the jacket 60 is formed of a thermoplastic polymer. According to some embodiments, the thickness of the jacket 60 is between about 0.20 and 1.0 mm. According to some embodiments, the outer diameter D4 (FIG. 6) of the jacket 60 (i.e., the outer diameter of the cable 20) is between about 2.75 and 3.25 mm and the cable 20 may be generally regarded as a 3.0 mm cable.

According to some embodiments, the inner diameter of the jacket passage is greater than the combined cross-sectional diameter of the optical fiber bundle 40 and the strength yarn bundle 50 so that at least the optical fibers 42 are loose and able to float within the jacket passage (i.e., move freely with respect to the jacket 60). According to some embodiments, both the optical fibers 42 and the strength yarns 52 are loose and can float within the jacket passage (i.e., can move freely with respect to the jacket 60). Thus, at least a portion of the volume of the jacket passage is not filled by the optical fibers 42 or the strength yarns 52 to allow movement of the optical fibers 42 and the strength yarns 52 within the jacket passage. The cable 20 may be referred to as a "round, loose tube cable". According to some embodiments, a non-round (e.g., oval) loose tube fiber optic cable can be employed instead.

The connector assembly 100 includes a connector housing 105, a ferrule 120, epoxy 126 (FIGS. 4 and 5), a ferrule boot 130, ferrule pins 132, a pin retainer 134, a spring 136, a crimp sleeve 150, and a strain relief boot 160. The connector housing 105 includes a front housing 110 and a rear housing 140. These components will be discussed in more detail below.

The front housing 110 includes an inner part 112 and an outer part 114 that are relatively slidable. A passage 116 extends through the front housing 110. The passage 116 has a generally oval or rectangular lateral cross-section.

The front housing 110 is substantially rigid. The front housing 110 may be formed of any suitable material. According to some embodiments, the front housing 110 is formed of a thermoplastic. According to some embodiments, the front housing 110 is formed of a polymeric material such as polyethermide. According to some embodiments, the front housing 110 has a flexural modulus of at least about 2 GPa. The front housing 110 may be formed using any suitable method such as molding.

The ferrule 120 defines a cavity 122 and a rear opening 124A and a top opening 124B each communicating with the cavity 122. Fiber holes 124C and pin holes 124D extend longitudinally through the ferrule 120. The fiber holes 124C are configured in side-by-side alignment across the width of the ferrule 120. The ferrule 120 has a front face 126. The ferrule 120 may be formed using any suitable materials and techniques. According to some embodiments, the ferrule 120 is formed of a polymeric material and, according to some embodiments, a composite material such as a glass filled polymer.

The ferrule boot 130 is tubular and may be formed of rubber. The ferrule pins 132, the pin retainer 134, the spring 136 and the crimp sleeve 150 may be formed of a suitable metal. The epoxy 128 may be a low stress thermal cure epoxy.

The rear housing 140 includes a front section 142 and a rear section 144. A pair of opposed latch tabs 142A extend laterally outwardly from the front section 142. Ribs 144A are formed on the rear section 144. A passage 146 extends longitudinally through the rear housing 140 from a rear opening 148A to a front opening 148B. According to some embodiments, the passage 146 and the front openings 148A, 148B are generally oval or rectangular as shown.

The rear housing 140 is substantially rigid. The rear housing 140 may be formed of any suitable material. According to some embodiments, the rear housing 140 is formed of thermoplastic. According to some embodiments, the rear housing 140 is formed of a polymeric material such as polyethermide. According to some embodiments, the rear housing 140 has a flexural modulus of at least about 2 GPa. The rear housing 140 may be formed using any suitable technique, such as molding.

The strain relief boot 160 includes a rear section 161A and a front section 161B. A passage 162 extends longitudinally through the strain relief boot 160 from a rear opening 162A to a front opening 162B. The passage 162 has a generally cylindrical rear section 162C and a generally oval or rectangular front section 162D. Outer ribs 164 are formed on the rear section 161A. Opposed top and bottom retention ribs 166 extend inwardly into the passage 162 adjacent the front opening 162B.

The strain relief boot 160 may be formed of any suitable material. According to some embodiments, the strain relief boot 160 is formed of a polymeric material. According to some embodiments, the strain relief boot 160 is formed of thermoplastic, thermoplastic elastomer, or thermoplastic rubber. According to some embodiments, the strain relief boot 160 has a flexural modulus of between about 0.05 and 0.5 GPa and according to some embodiments, the flexural modulus may be higher with segmented strain relief designed to allow additional flex. The strain relief boot 160 may be formed using any suitable technique. According to some embodiments, the strain relief boot 160 is molded.

The fibers 42 extend through the fiber holes 124C in the ferrule 120 such that fiber ends 45 are located at the front face 126 of the ferrule 120. The fibers 42 are secured in the ferrule 120 by the epoxy 128. The ferrule 120 is positioned in the front housing passage 116 such that a portion of the ferrule 120 extends forwardly of the front housing 110. The rear housing 140 is coupled to the front housing 110 by the tabs 142A such that the front section 142 is retained in the passage 116. The ferrule boot 130 and the spring 136 surround the fibers 42. The ferrule 120 is held in the passage 116 by the pin retainer 134, which is held in place by the spring 136, which is braced by the inner housing 140. The pins 132 extend through the pin holes 124D such that they protrude from the front face 126. The pins 132 are also held in place by the pin retainer 134.

The strength yarn bundle 50 and the jacket 60 are secured to the rear housing 140 by the crimp ring 150. More particularly, segments of the yarn bundle 50 and the jacket 60 are captured between the rear section 144 of the rear housing 140 and the crimp sleeve 150, which is crimped in place.

The strain relief boot 160 is secured to the rear housing 140 by the ribs 166, which engage the front edge of the crimp sleeve 150. The rear section 144 is positioned in the front passage section 162D. A layer of tape 70 or adhesive may be present on the fiber bundle 40 within the front housing 110 and/or the rear housing 140 and/or a rear portion of the ferrule inside the epoxy 128.

Figure 4:
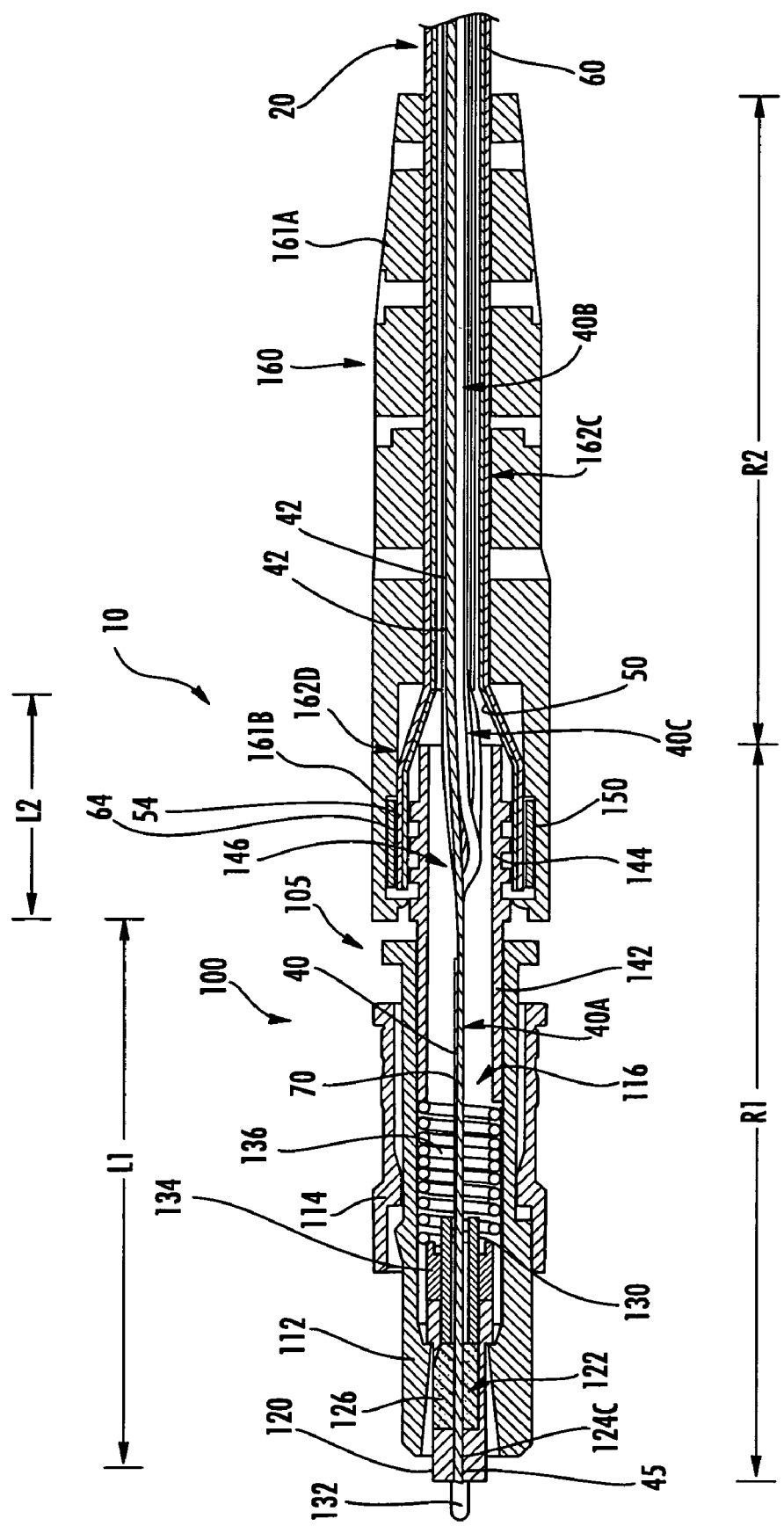
FIG. 4 is a cross-sectional view of the connectorized cabling of FIG. 1 taken along the line 4-4 of FIG. 1.
Figure 5:
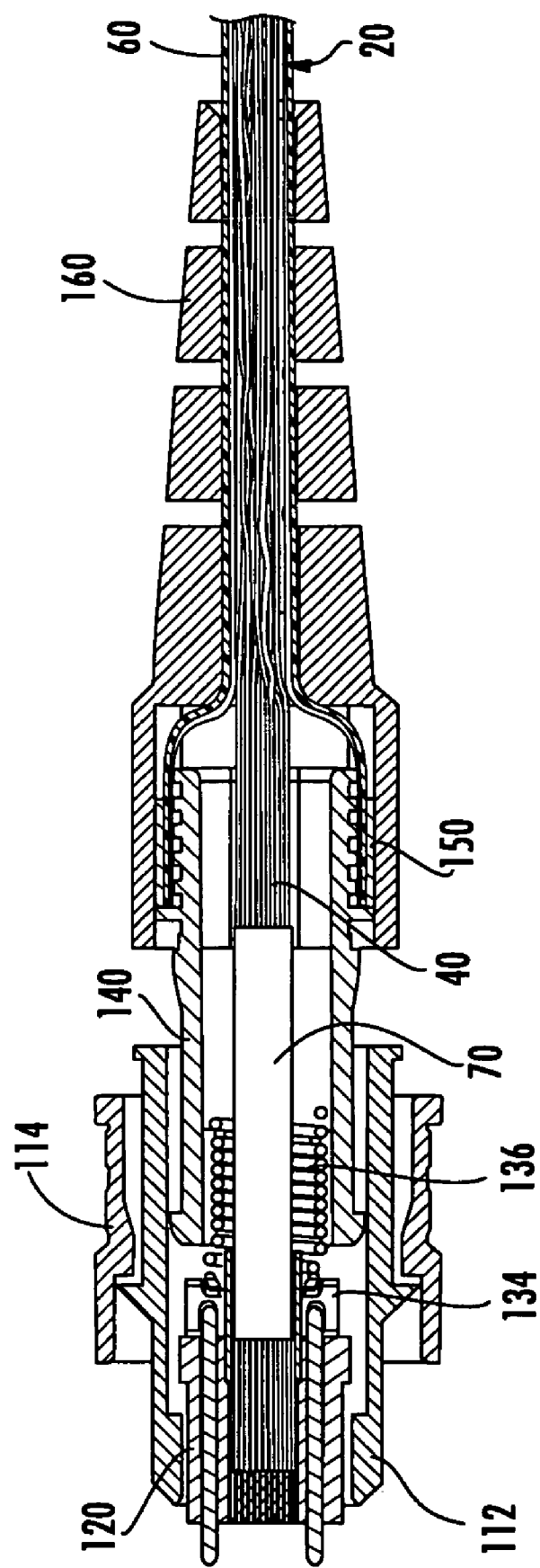
FIG. 5 is a cross-sectional view of the connectorized cabling of FIG. 1 taken along the line 5-5 of FIG. 1.

As shown in FIGS. 4 and 5, the fiber bundle 40 extends from the front face 126, through the front housing 110, the ferrule 120, the ferrule boot 130, the spring 136, the rear housing 140, the crimp sleeve 150 and the strain relief boot 160. The fiber bundle 40 has three segments or sections, as follows: a ribbonized fiber section 40A, a non-ribbonized fiber section 40B, and a fiber transition section 40C between the sections 40A and 40B. In the ribbonized section 40A, the fibers 42 are aligned in ordered, side-by-side relation with one another (which may be referred to as a "ribbon configuration"). According to some embodiments, the portions of the fibers 42 in the ribbonized section 40A are disposed and extend generally in a single row or common plane as shown to provide a relatively wide, thin construction. In the non-ribbonized section 40B, the fibers 42 are generally loose and disposed in various non-mutual planes. According to some embodiments, in the non-ribbonized section 40B the fibers 42 have a generally round configuration. In the transition section 40C, the fibers 42 are undergoing a transition (i.e., changing, converting, transforming or transiting) from the loose configuration to the ribbonized configuration.

According to some embodiments, the ribbonized section 40A has a length L1 (FIG. 4) of at least about 5 mm. According to some embodiments, the length L1 is between about 5 and 10 mm. According to some embodiments, the transition section 40C has a length L2 (FIG. 4) of between about 20 and 30 mm.

With reference to FIGS. 4 and 5, the connector assembly 100 has a fixed or rigid region or portion R1 on the plug side and a strain relief or bendable region or portion R2 on the cable side. In the portion R1, the connector assembly 100 prevents the segment of the cable 20 therein from being bent. According to some embodiments, the rigid portion R1 may extend rearwardly beyond the rear opening of the housing 105. In the portion R2, the connector assembly 100 may permit non-destructive bending of the cable 20. In particular, in the rear section 161A of the strain relief boot 160 (i.e., generally the portion having the ribs 164), the strain relief boot 160 can be bent with decreasing amounts of strain relief and bend radius limitation from the rear housing 140 to the boot rear opening 162A. The strain relief boot 160 may limit the cable bend angle to a gradual bend to thereby prevent or reduce bend related fiber breaks and/or performance losses. Thus, according to some embodiments, at least a portion of the strain relief boot 160 is semi-rigid to provide controlled fiber bend.

Termination of the connector assembly 100 on the cable 20 in accordance with embodiments of the present invention may be regarded as a round, loose tube fiber cable to array connector direct termination. The connector assembly 100 receives a round, loose tube fiber cable section and the fiber bundle of the round, loose cable section is converted or reconfigured to a ribbonized fiber bundle within the rigid portion R1 of the connector assembly 100. Thus, the entirety of the ribbonized fiber section 40A is contained in the rigid portion R1. Thus, according to some embodiments, none of the ribbonized fiber bundle is located where it can be bent in use. This termination allows for the benefits of round, loose fiber cabling up to the connector termination. For example, as compared to ribbon cable or a cable furcation assembly, a round, loose cable segment may be easier to bend, may be bendable with less loss of cable performance, and may have less or no preferential bending limitations. Moreover, termination in accordance with embodiments of the present invention may obviate the need for furcation tubing and the related expense, mess and effort.

The strain relief boot passage 162 has a rear section 162A that is round in cross-section (i.e., cylindrical) and properly sized to complement the round cable 20. In this way, the strain relief boot 160 may properly engage the directly terminated round cable to provide suitable strain relief thereto.

Figure 14:
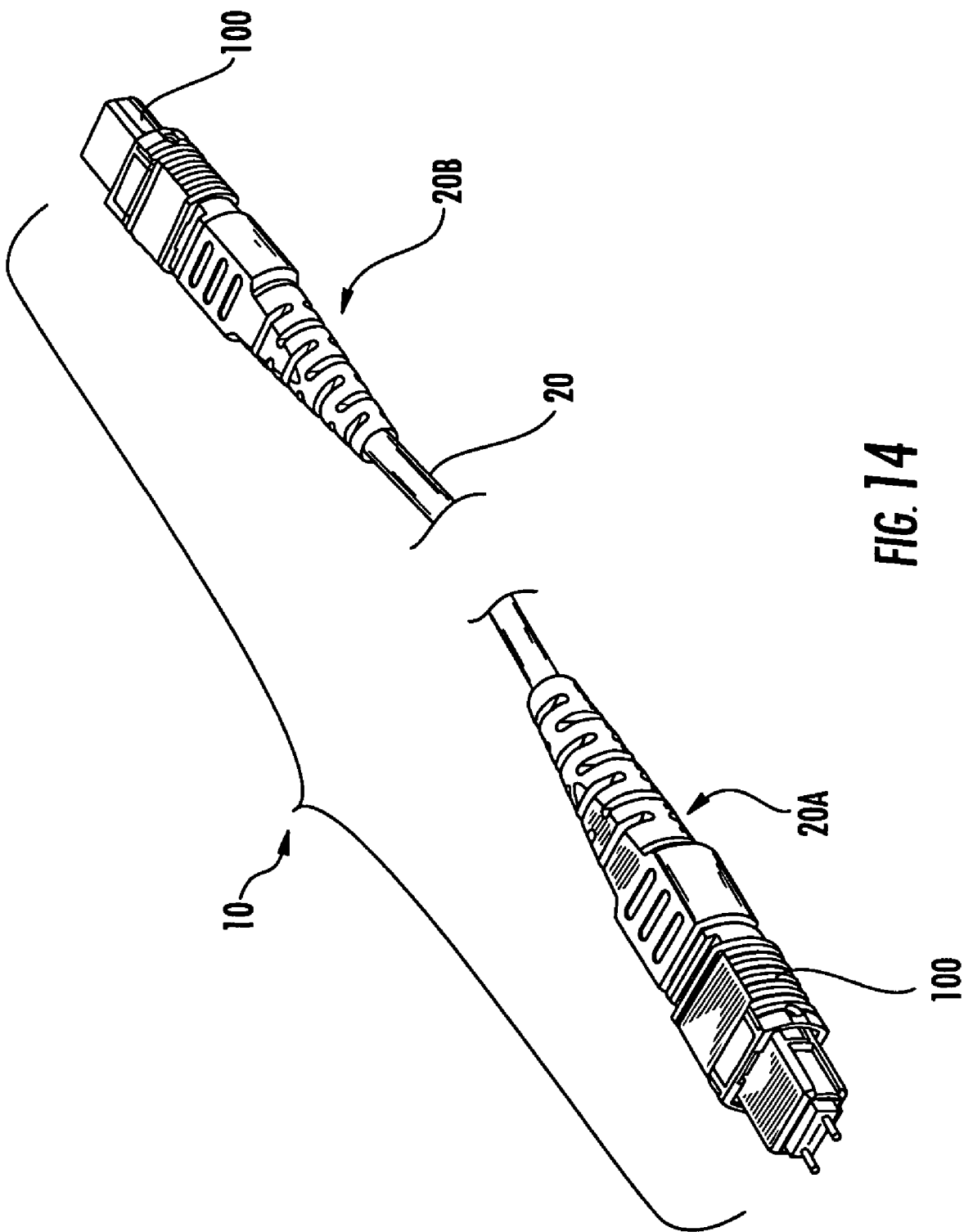
FIG. 14 is a fragmentary, perspective view of a cordage in accordance with embodiments of the present invention.

According to some embodiments, the connectorized cabling 10 is a cabling or cordage as shown in FIG. 14 including a length of the cable 20 having a first termination end 20A and a second opposing termination end 20B, and a respective connector assembly 100 installed directly on either termination end 20A, 20B of the cable 20. The two connector assemblies 100 may be configured the same or differently from one another. The optical fibers 42 extend from the termination end 20A to the termination end 20B. According to some embodiments, the strength yarns 52 are crimped or otherwise secured directly to both connector assemblies 100 as described herein. The strength yarns 52 extend continuously from one connector assembly 100 to the other and provide strain relief at both connector assemblies. According to some embodiments and as shown, the jacket 60 also extends continuously from and is directly secured to each connector assembly 100.

Connectorized cables in accordance with embodiments of the present invention such as the connectorized cabling 10 may be formed using methods in accordance with embodiments of the present invention. According to some embodiments, the connectorized cable 10 can be assembled as follows.

Figure 8:
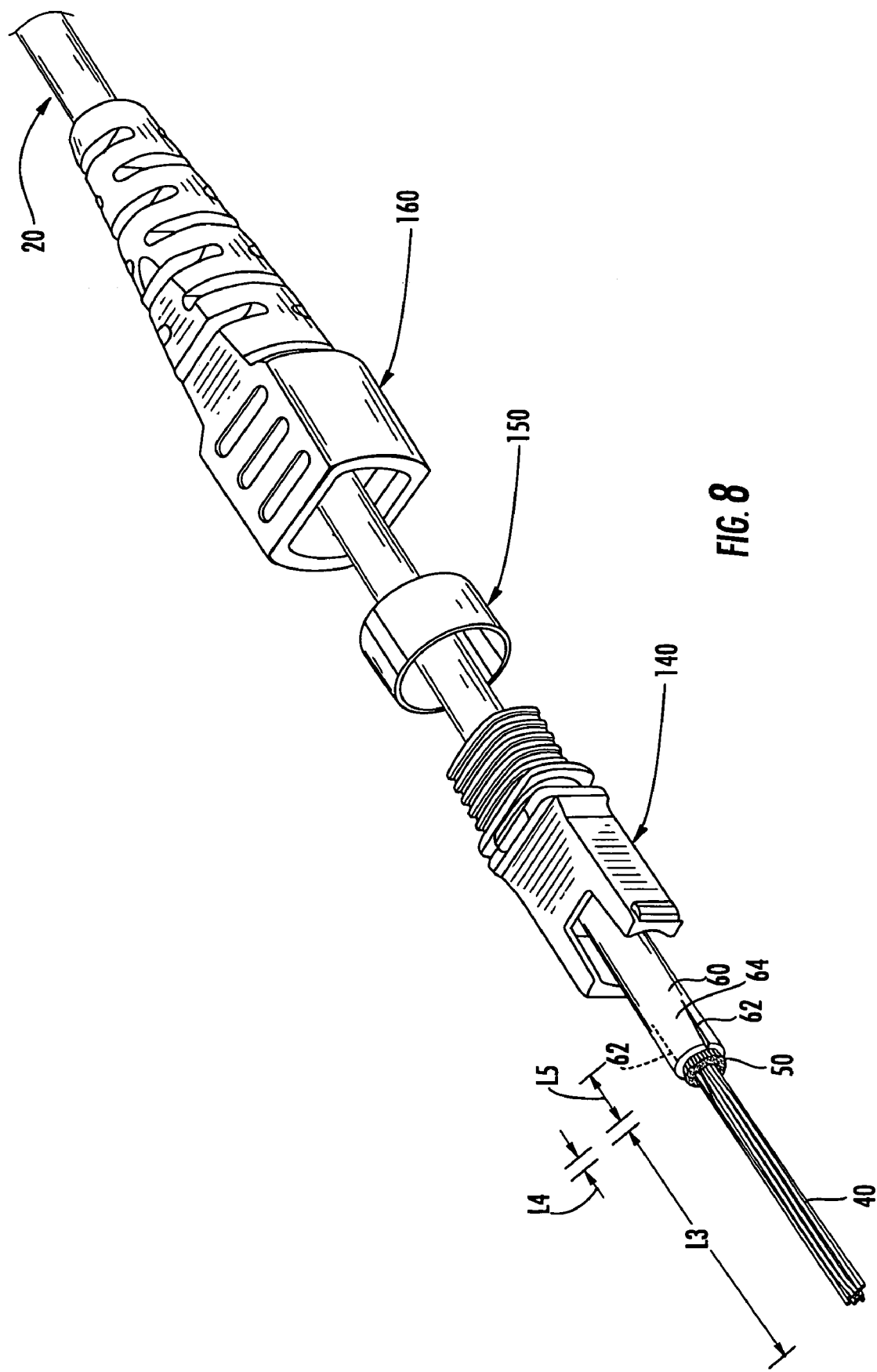
FIGS. 8-13 illustrate method steps for forming the connectorized cabling of FIG. 1 in accordance with method embodiments of the present invention.

The strain relief boot 160, the crimp sleeve 150 and the rear housing 140 are slid onto the cable 20 and out of the way as shown in FIG. 8 (which is a front perspective view). The cable 20 is cut or trimmed such that a section of the strength member bundle 50 extends beyond the jacket 60 a length L4, and a section of the fiber bundle 40 extends beyond the strength yarn bundle 50 a length L3. According to some embodiments, the length L3 is at least about 45 mm. According to some embodiments, the length L4 is at least about 2 mm.

Figure 9:
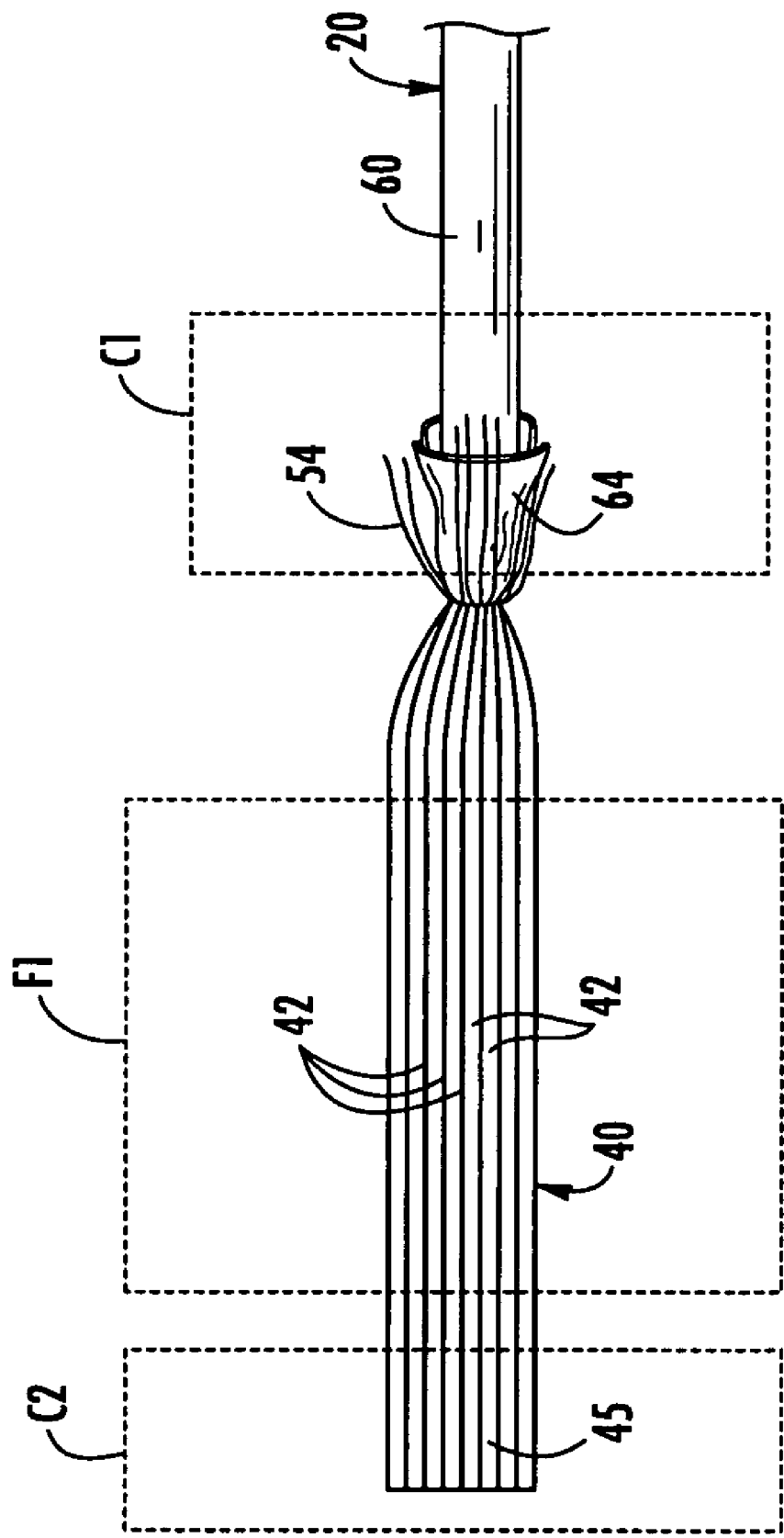

As also shown in FIG. 8, the jacket 60 is longitudinally cut on opposed lateral sides to form opposed side slits 62 and opposed top and bottom jacket flaps 64. According to some embodiments, the length L5 of the slits 62 is at least about 13 mm. The jacket flaps 64 and end segments 54 of the yarns 52 are folded back onto the jacket 60 as shown in FIG. 9 and secured in place, for example, using a jacket clamp C1.

Figure 10:
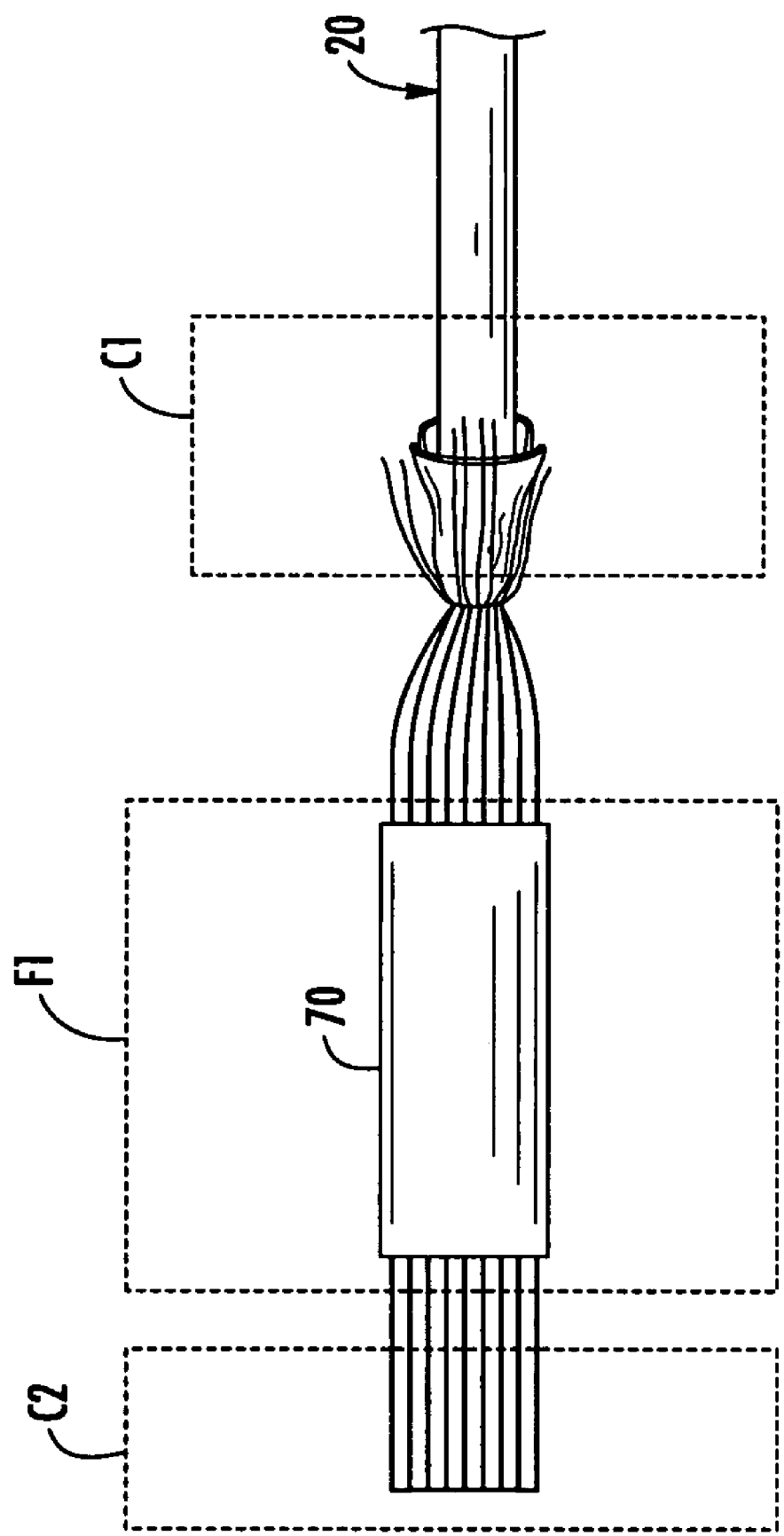

The fiber bundle 40 is then ribbonized using any suitable technique. According to some embodiments and with reference to FIG. 9 (which is a top view), the fibers 42 of the fiber bundle 40 are inserted into a fiber alignment tool or ribbonizing fixture F1 such that the fibers 42 are properly relatively positioned and aligned. The fixture F1 may be grooved or non-grooved. A fiber clamp C2 may be applied to the free ends 45 of the fibers 42 to temporarily secure the fiber bundle 40 in the ribbonized configuration. Tape 70 (FIG. 10) is applied to the ribbonized segment of the fiber bundle 40 to permanently or semi-permanently secure the segment in ribbonized configuration. Alternatively or additionally, a liquid adhesive or the like may be applied to the ribbonized segment of the fiber bundle 40. Also, other types of fixtures may be employed to assist in ribbonizing the fiber bundle 40. According to some embodiments, a Fujikura FAT-04 tool is used to apply an adhesive to the ribbonized fibers. According to some embodiments, the length of the gap between the rear edge of the ribbonizing tape 70 (or adhesive) and the base of the jacket flaps 64 is 15 mm or less.

Figure 11:
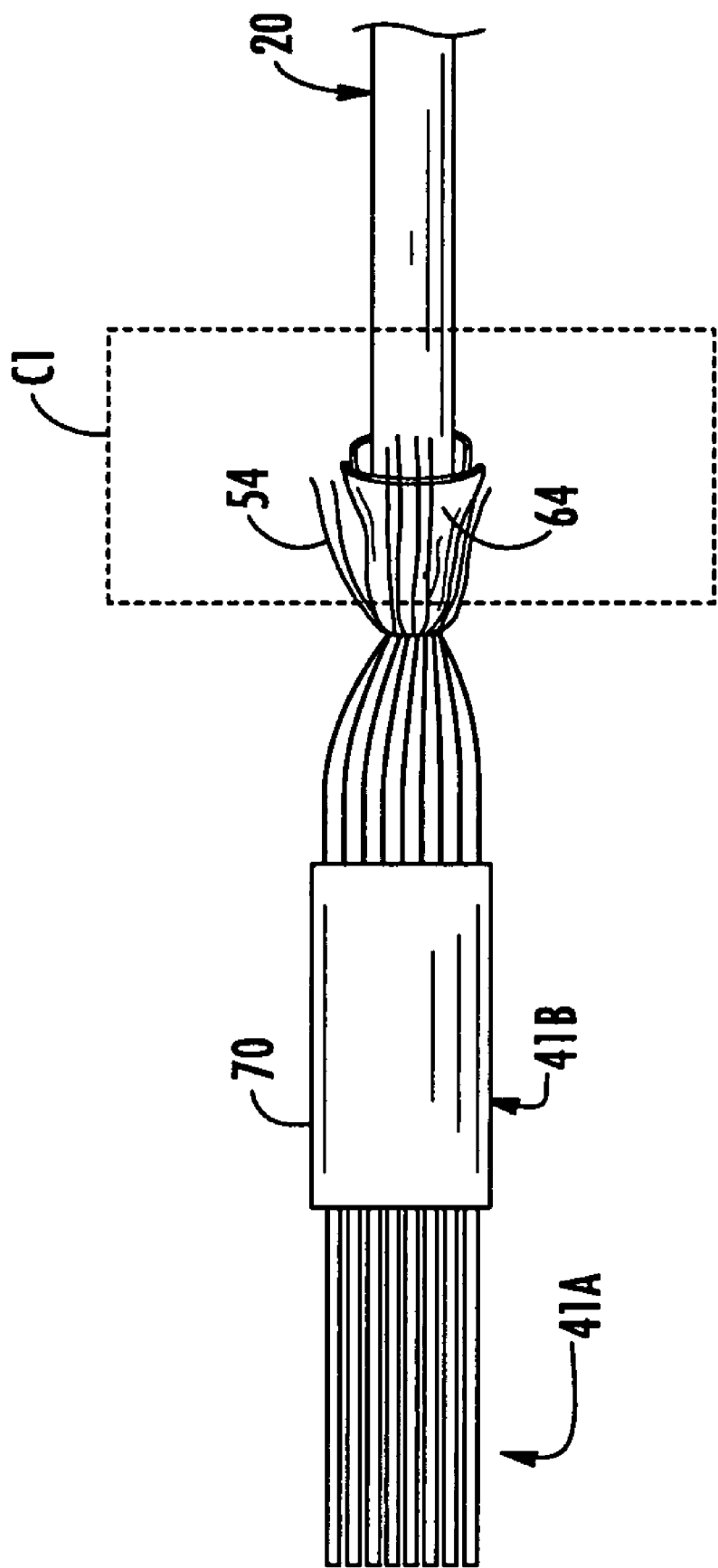

With reference to FIG. 11 (which is a top view), the end section of the fiber bundle 40 is then stripped to remove the tape 70 or adhesive thereon and the fiber coating layer 44. A thermal heat stripping tool such as a Fujiura HJS-02 Hot Jacket Stripper in conjunction with a Fujikura FH-12 modified to accommodate the round cable may be used to strip the fibers 42. In this manner, a bare fiber section 41A is formed extending from the fiber free ends 45 to a taped fiber section 41B. The bare fiber section 41A likewise has a ribbonized configuration.

Figure 12:
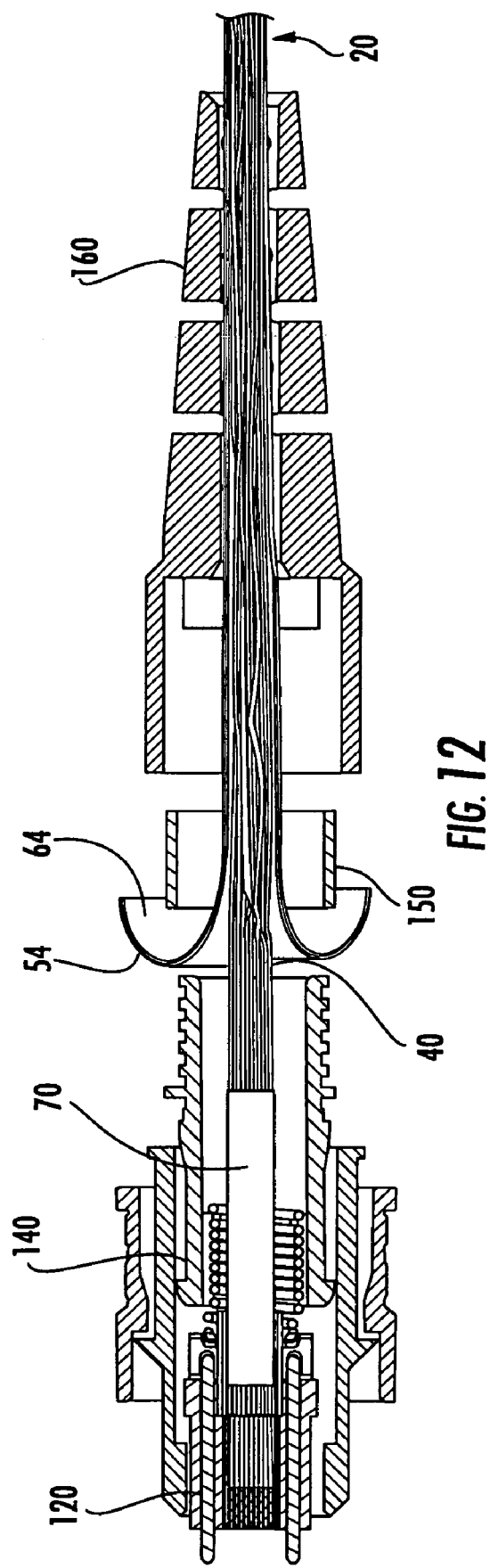

With reference to FIG. 12, the spring 136 and the ferrule boot 130 are slid onto the ribbonized fiber bundle 40. The bare fibers of the fiber section 41A are inserted into and through respective ferrule fiber holes 124C. The epoxy 128 is injected or otherwise introduced into the ferrule cavity 122 through the top opening 124B and cured to secure the fibers 42 in the fiber holes 124C. Portions of the fibers 42 can then be cleaved and the front face 126 may be polished as needed. The ferrule pins 132 and the pin retainer 134 are installed on the ferrule 120. The front housing 110 is mounted on the ferrule 120. The spring 136 and the rear housing 140 are slid forward until the rear housing 140 latches with the front housing 110.

Figure 13:
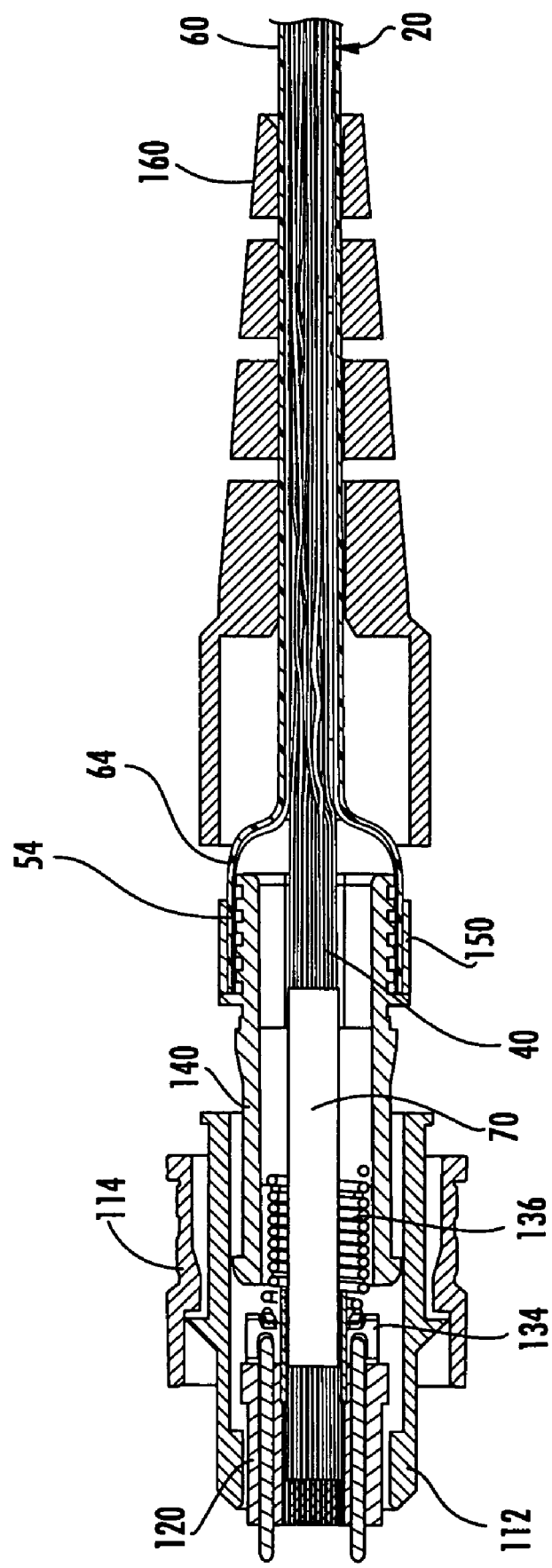

With reference to FIG. 13, the jacket flaps 64 and the end sections 54 of the strength yarns 52 are folded forward around the rear section 144 of the rear housing 140. The crimp sleeve 150 is then slid forward over the jacket flaps 64, the yarn end sections 54 and the rear housing rear section 144. The crimp sleeve 150 is then crimped (e.g., using a suitable tool) to secure the jacket flaps 64 and the yarn ends 54 to the rear section 144.

The strain relief boot 160 is then slid forward on the cable 20 until the retention tabs or ribs 166 engage the front edge of the crimp sleeve 150.

According to some embodiments, the foregoing procedure is executed in a factory.

While a single layer ribbonized fiber section is provided in the illustrated embodiments, according to some embodiments, the ribbonized section may include multiple, stacked rows of the fibers in side-by-side alignment.

It will be appreciated that other configurations of connector assemblies may be employed. For example, the ferrule pins 132 may be omitted to form a female connector assembly for use with the male connector assembly 100 as illustrated. The pins 132 of the male connector assembly 100 may be received in the pin holes of the female connector assembly to facilitate alignment between the respective mating fiber ends. The male and female connector assemblies may be held together by an adapter, for example.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A connectorized fiber optic cabling assembly comprising:
   a) a loose tube fiber optic cable having a termination end and including:
      an optical fiber bundle including a plurality of optical fibers;
      at least one strength member; and
      a jacket surrounding the optical fiber bundle and the at least one strength member; and
   b) a connector assembly including a rigid portion and defining at least one fiber passage, wherein the connector assembly is mounted on the termination end of the cable such that the optical fiber bundle extends through at least a portion of the at least one fiber passage;
   c) wherein the plurality of optical fibers of the optical fiber bundle have a ribbonized configuration in the rigid portion of the connector assembly and a loose, non-ribbonized configuration outside the rigid portion, and the plurality of optical fibers undergo a transition from the ribbonized configuration to the loose, non-ribbonized configuration in the rigid portion of the connector assembly.

2. The connectorized fiber optic cabling of claim 1 wherein the cable is a round, loose tube fiber optic cable.

3. The connectorized fiber optic cabling of claim 1 wherein the rigid portion of the connector assembly includes a rigid connector housing.

4. The connectorized fiber optic cabling of claim 3 wherein at least one of the jacket and the at least one strength member is directly secured to the connector housing.

5. The connectorized fiber optic cabling of claim 4 wherein the jacket and the at least one strength member are each directly secured to the connector housing.

6. The connectorized fiber optic cabling of claim 5 wherein the jacket and the at least one strength member are each directly secured to the connector housing by a crimp ring.

7. The connectorized fiber optic cabling of claim 3 including a strain relief boot mounted on the connector housing and having a boot passage, wherein the cable extends through the boot passage.

8. The connectorized fiber optic cabling of claim 7 wherein the boot passage includes a front section proximate the connector housing and a rear section distal from the connector housing, wherein the front section is configured to receive a rear portion of the connector housing and the rear section has a round shape complementary to the jacket.

9. The connectorized fiber optic cabling of claim 1 including a tape and/or adhesive covering and bonding together a segment of the optical fiber bundle having the ribbonized configuration in the rigid portion of the connector assembly.

10. The connectorized fiber optic cabling of claim 1 wherein the connector assembly includes a ferrule having a plurality of side-by-side aligned fiber holes, and wherein each of the plurality of optical fibers extends through a respective one of the fiber holes.

11. The connectorized fiber optic cabling of claim 10 including an epoxy securing the plurality of optical fibers in the respective fiber holes.

12. The connectorized fiber optic cabling of claim 1 wherein the optical fiber bundle includes at least eight optical fibers.

13. A method for forming a connectorized fiber optic cabling assembly, the method comprising:
   a) providing a loose tube fiber optic cable having a termination end and including:
      an optical fiber bundle including a plurality of optical fibers having a loose, non-ribbonized configuration;
      at least one strength member; and
      a jacket surrounding the optical fiber bundle and the at least one strength member; and
   b) mounting a connector assembly including a rigid portion and defining at least one fiber passage on the termination end of the cable such that the optical fiber bundle extends through at least a portion of the at least one fiber passage, and such that the plurality of optical fibers of the optical fiber bundle have a ribbonized configuration in the rigid portion of the connector assembly and a loose, non-ribbonized configuration outside the rigid portion, and the plurality of optical fibers undergo a transition from the ribbonized configuration to the loose, non-ribbonized configuration in the rigid portion of the connector assembly.

14. The method of claim 13 wherein the cable is a round, loose tube fiber optic cable.

15. The method of claim 13 wherein the rigid portion of the connector assembly includes a rigid connector housing.

16. The method of claim 15 including securing at least one of the jacket and the at least one strength member directly to the connector housing.

17. The method of claim 16 including securing each of the jacket and the at least one strength member directly to the connector housing.

18. The method of claim 17 including securing the jacket and the at least one strength member directly to the connector housing by crimping a crimp ring about the jacket, the at least one strength member and the connector housing.

19. The method of claim 15 including mounting a strain relief boot having a boot passage on the connector housing such that the cable extends through the boot passage.

20. The method of claim 19 wherein mounting the strain relief boot on the connector housing includes inserting a rear portion of the connector housing in a front section of the boot passage and inserting the cable through a rear section of the boot passage, wherein the rear section has a round shape complementary to the jacket.

21. The method of claim 13 including ribbonizing a segment of the optical fiber bundle prior to mounting the connector assembly on the termination end of the cable.

22. The method of claim 21 including:
cutting the jacket;
folding a flap portion of the jacket back away from the terminal end of the cable; thereafter
ribbonizing the segment of the optical fiber bundle; thereafter
folding the flap portion back toward the terminal end of the cable and over the connector housing; and thereafter
securing the flap portion of the jacket to the connector housing.

23. The method of claim 21 including applying a tape and/or adhesive onto the ribbonized segment of the optical fiber bundle to retain the plurality of optical fibers in the ribbonized configuration.

24. The method of claim 13 wherein the connector assembly includes a ferrule having a plurality of side-by-side aligned fiber holes, and the method includes inserting each of the plurality of optical fibers into a respective one of the fiber holes.

25. The method of claim 24 including applying an epoxy to the connector assembly and the plurality of optical fibers to secure the plurality of optical fibers in the respective fiber holes.

26. A connectorized fiber optic cabling assembly comprising:
a) a loose tube fiber optic cable having a termination end and including:
an optical fiber bundle including a plurality of optical fibers;
at least one strength member; and
a jacket surrounding the optical fiber bundle and the at least one strength member; and
b) a connector assembly mounted directly on the termination end of the cable;
c) wherein the plurality of optical fibers of the optical fiber bundle have a ribbonized configuration in the connector assembly and a loose, non-ribbonized configuration outside the connector assembly and in the cable.

27. The connectorized fiber optic cabling of claim 26 wherein the cable is a round, loose tube cable.

28. The connectorized fiber optic cabling of claim 26 wherein:
the cable has a second termination end;
the connectorized fiber optic cabling further includes a second connector assembly mounted directly on the second termination end of the cable;
the at least one strength member extends continuously from the first connector assembly to the second connector assembly and is directly secured to each of the first and second connector assemblies; and
the plurality of optical fibers of the optical fiber bundle have a ribbonized configuration in the second connector assembly.

29. The connectorized fiber optic cabling of claim 28 wherein the jacket extends continuously from the first connector assembly to the second connector assembly and is directly secured to each of the first and second connector assemblies.

30. The connectorized fiber optic cabling of claim 26 wherein the plurality of optical fibers undergo a transition from the ribbonized configuration to the loose, non-ribbonized configuration in the connector assembly.

31. A method for forming a connectorized fiber optic cabling assembly, the method comprising:
a) providing a loose tube fiber optic cable having a termination end and including:
an optical fiber bundle including a plurality of optical fibers;
at least one strength member; and
a jacket surrounding the optical fiber bundle and the at least one strength member; and
b) mounting a connector assembly directly on the termination end of the cable such that the plurality of optical fibers of the optical fiber bundle have a ribbonized configuration in the connector assembly and a loose, non-ribbonized configuration outside the connector assembly and in the cable.

32. The method of claim 31 wherein the cable is a round, loose tube cable.

33. The method of claim 31 including mounting a second connector assembly directly on a second termination end of the cable such that the plurality of optical fibers of the optical fiber bundle have a ribbonized configuration in the second connector assembly, and the at least one strength member extends continuously from the first connector assembly to the second connector assembly, including directly securing the at least one strength member to each of the first and second connector assemblies.

* * * * *